INVENTOR.
PAUL A. FRANK

Feb. 28, 1956 P. A. FRANK 2,736,059
TIRE CURING PRESS

Filed July 6, 1950 12 Sheets-Sheet 6

INVENTOR.
PAUL A. FRANK
BY
Oberlin + Limbach
ATTORNEYS.

Feb. 28, 1956  P. A. FRANK  2,736,059
TIRE CURING PRESS
Filed July 6, 1950  12 Sheets-Sheet 8

INVENTOR.
PAUL A. FRANK
BY
Oberlin & Limbach
ATTORNEYS.

Feb. 28, 1956  P. A. FRANK  2,736,059
TIRE CURING PRESS
Filed July 6, 1950  12 Sheets-Sheet 9

INVENTOR.
PAUL A. FRANK
BY
Oberlin & Limbach
ATTORNEYS.

Feb. 28, 1956    P. A. FRANK    2,736,059
TIRE CURING PRESS
Filed July 6, 1950    12 Sheets-Sheet 10
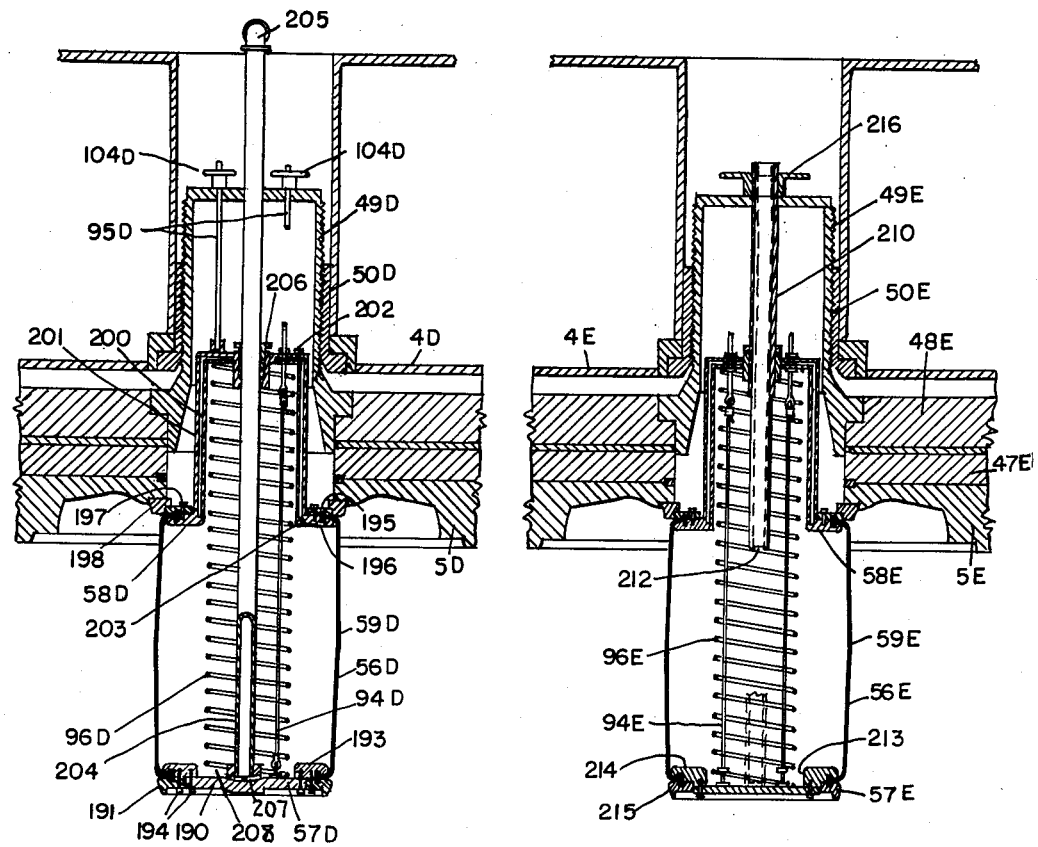
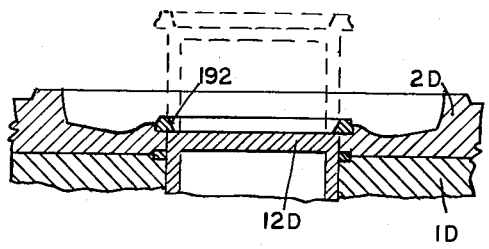
Fig. 11
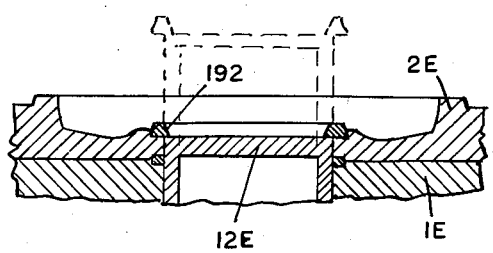
Fig. 12
INVENTOR.
PAUL A. FRANK
BY
Oberlin + Limbach
ATTORNEYS.

Feb. 28, 1956  P. A. FRANK  2,736,059
TIRE CURING PRESS
Filed July 6, 1950  12 Sheets-Sheet 11
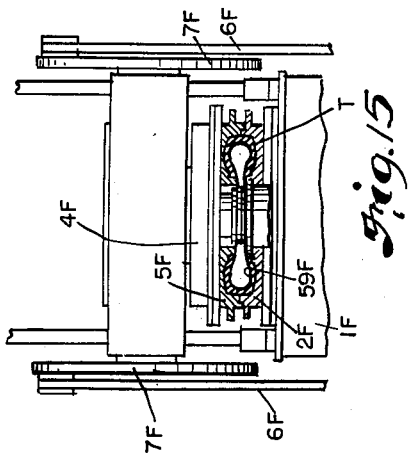
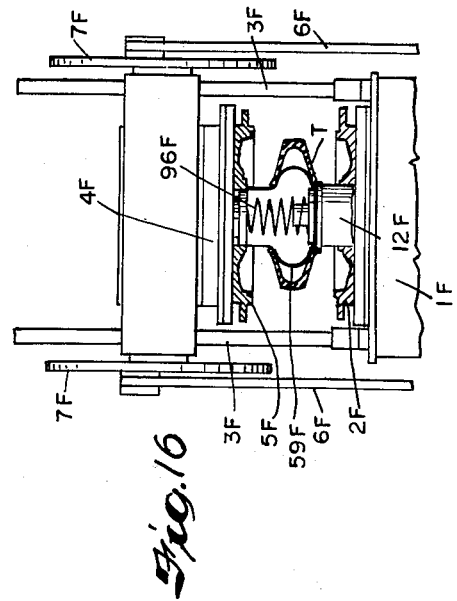
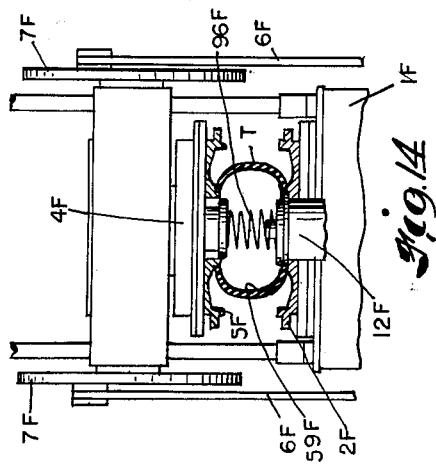
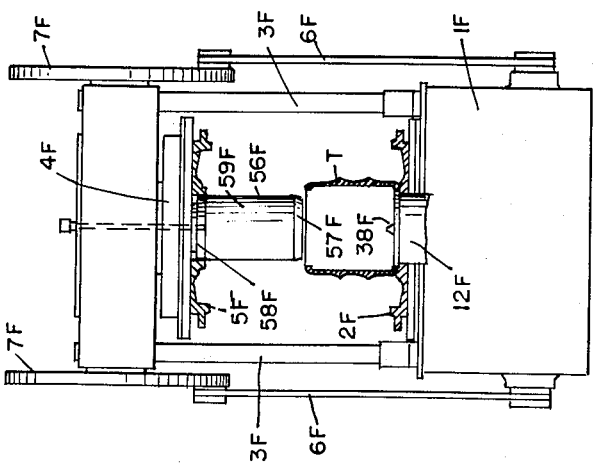
INVENTOR.
PAUL A. FRANK
BY
Oberlin & Limbach
ATTORNEYS

United States Patent Office 2,736,059
Patented Feb. 28, 1956

2,736,059
TIRE CURING PRESS
Paul A. Frank, Akron, Ohio

Application July 6, 1950, Serial No. 172,313

5 Claims. (Cl. 18—17)

The present invention relates generally as indicated to tire curing presses and more particularly to presses of the type in which a green tire carcass in pulley-band form is adapted to be shaped into tire form by the axial forcing together of the bead portions of the band and concurrent radial expansion of the wall thereof, such shaping forces being imposed through the engagement of the band between complementary ring-like mold sections which are movable axially toward each other and by the radial expansion of the elastic side wall of a diaphragm assembly positioned within the band, said diaphragm assembly including opposed heads which are similarly moved axially toward each other during the closing of the press and an elastic diaphragm of normally generally cylindrical shape having opposite ends secured to such heads. In the closed condition of such presses, the carcass is held against the walls of the mold cavity defined between the mold sections by the radially expanded diaphragm and is cured by circulating curing medium, such as steam for example, through the diaphragm assembly and through cored passages in the mold sections.

Some of the objections to prior art curing presses of the character referred to and which it is herein proposed, as well as in my co-pending application, Serial No. 140,479, filed January 25, 1950, now Patent 2,559,119, granted July 3, 1951, to solve are that the diaphragm assembly projects centrally and axially from a band-supporting bottom mold section thereby requiring not only lifting of the pulley band into telescoped relationship around such diaphragm assembly at the beginning of the press operation, but also the lifting of the cured tire over such assembly subsequently to the opening of the press and that because of the necessity for providing a clearance to enable such lifting of the band of the finished tire complicated mold actuating mechanisms must be employed in order to first relatively move the mold sections axially in parallel relation with respect to each other during the final stages of the closing operation and the initial stages of the opening operation and angularly during the initial stage of the closing operation and final stage of the opening operation.

The solution to these and other problems in the present construction resides in the provision of a diaphragm assembly which is carried by or is retractable wholly or partially into a well centrally within the movable mold section or retractable into a well centrally within the fixed mold section whereby, when the press is open, the space between the mold sections is freed of obstruction to permit lateral insertion of the pulley band and lateral removal of the cured tire without requiring lifting of the band or tire over a projecting diaphragm assembly.

In the co-pending application aforesaid, the diaphragm assembly is retractable into a well in the bottom stationary mold section and in this respect the present application is concerned with certain improvements in such downwardly retractable diaphragm assembly whereby the height of the press from the floor to the bottom mold section may be maintained at a convenient working height without having a portion of the well extending below the floor level or without providing an elevated platform around the press.

Except as noted above, the present invention is primarily concerned with a press in which the diaphragm assembly is either carried in depending relation from the movable top mold section or retractable wholly or partially into such top mold section, and of course in the former instance the travel of the top mold section should be approximately twice the height of the pulley band which is adapted to be positioned on the bottom mold section and in the latter instance, wherein entire retraction of the diaphragm assembly is provided for, such travel of the top mold section should correspond generally with the height of the pulley band and preferably somewhat more in order to provide clearance for facilitating lateral insertion of the band between the mold sections without requiring tilting thereof.

Accordingly, it is one object of this invention to provide improvements as aforesaid in tire curing presses which render the same simple in form and economical to manufacture and which are fool-proof and efficient in operation.

Another object of this invention is to provide a tire curing press having a tire-lifting mechanism associated therewith which strips the cured tire from the bottom mold section to eliminate the possibility of overcuring and blemishing of the tire by contact with the heated mold section.

Another object of this invention is to provide novel means for rapidly disposing of the curing medium which may collect in the diaphragm assembly during the curing operation.

Another object of this invention is to provide novel guide means for positioning the diaphragm assembly centrally within a tire carcass to be shaped and cured in the press and centrally between the mold sections.

Another object of this invention is to provide a press, in one modification of which the mold actuating mechanism is carried on the upper movable platen of the press to provide free access to the space between the mold sections when the press is open.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 3:
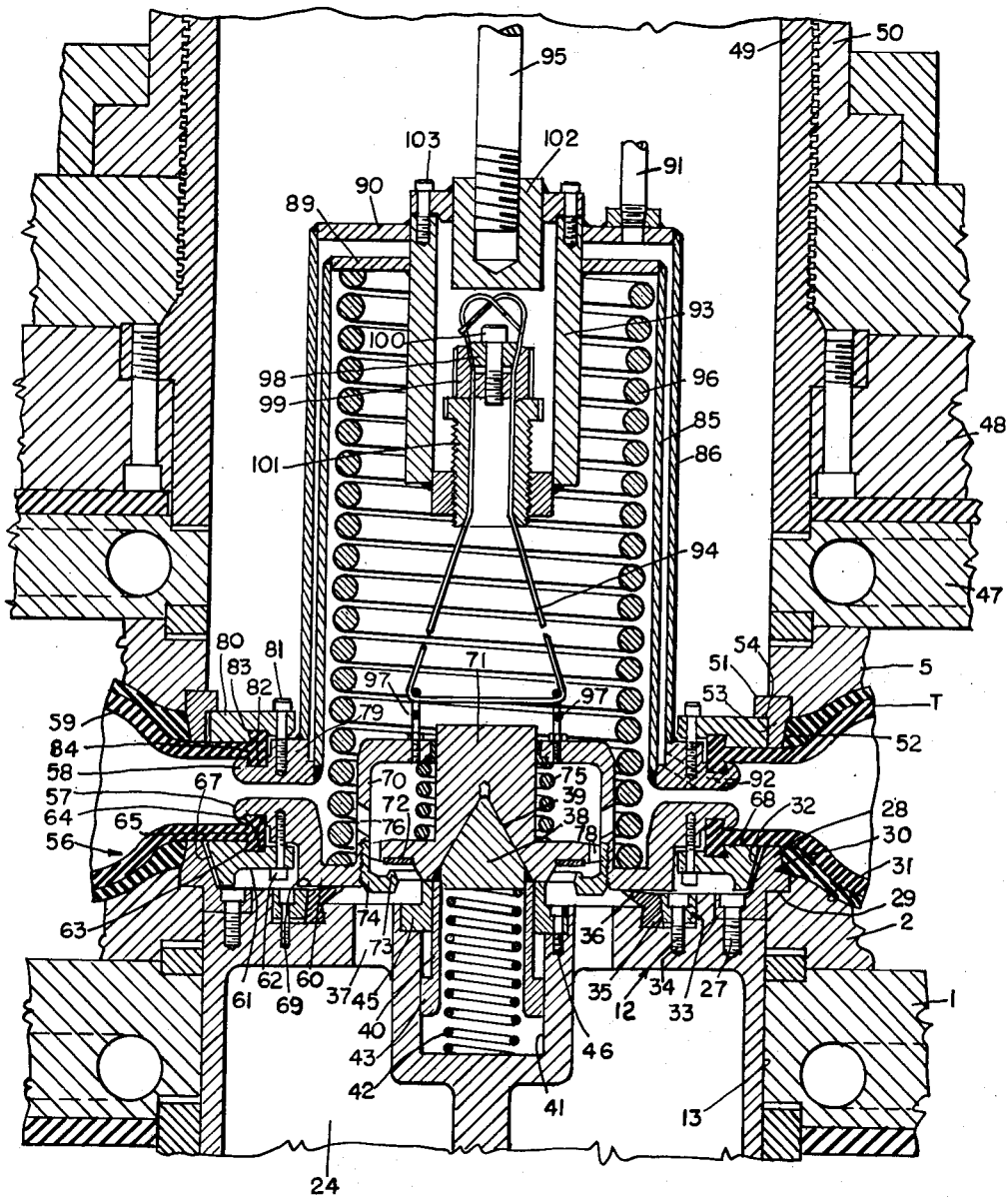
Fig. 3 is an enlarged fragmentary cross section view showing the press of Fig. 1 in closed position.
Figure 5:
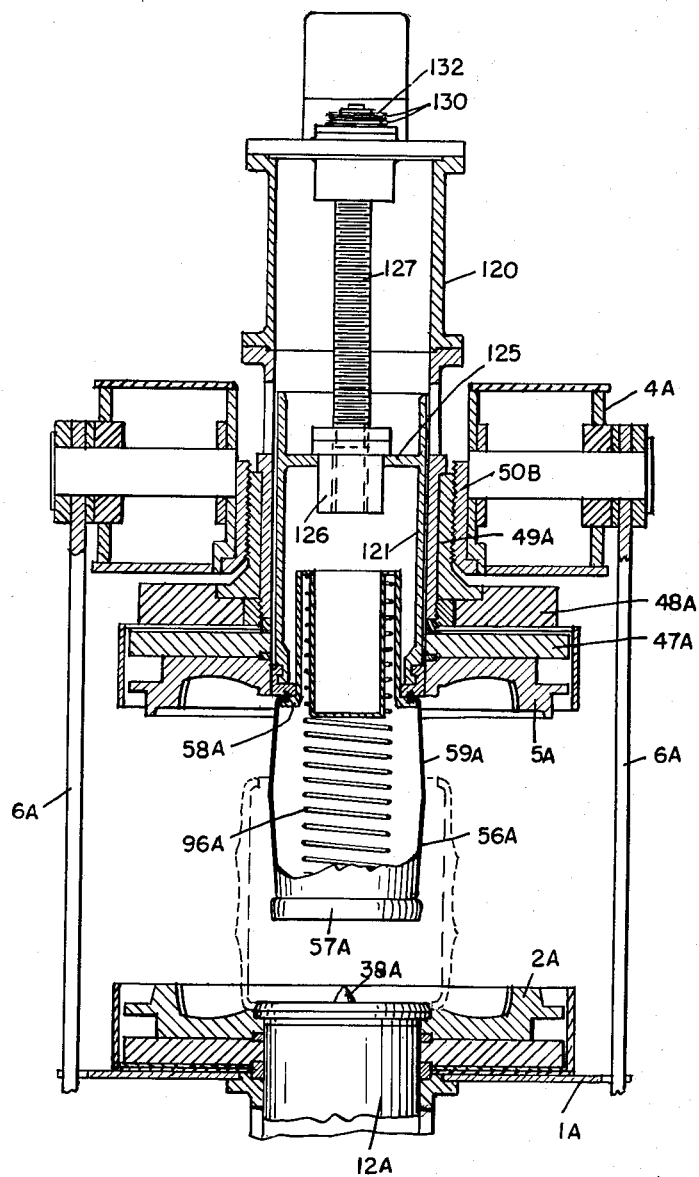
Fig. 5 is a cross section view similar to Fig. 4 except showing the diaphragm assembly protracted downwardly into a pulley-band supported on the bottom mold section.
Figure 6:
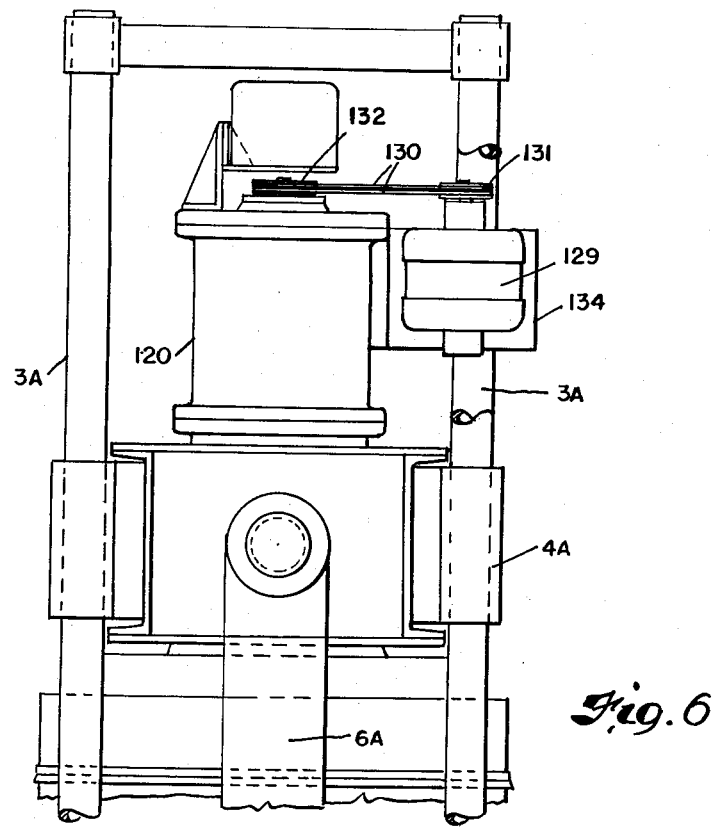
Fig. 6 is a side elevation view of the press of Figs.
Figure 7:
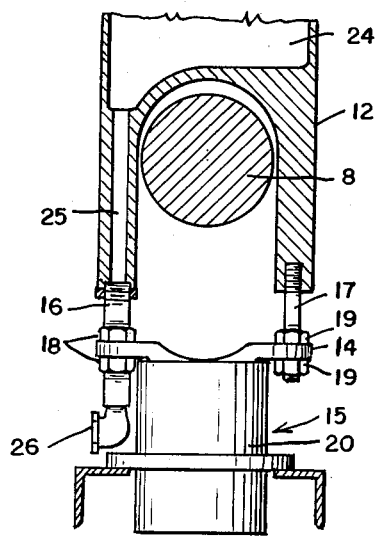
Figure 8:
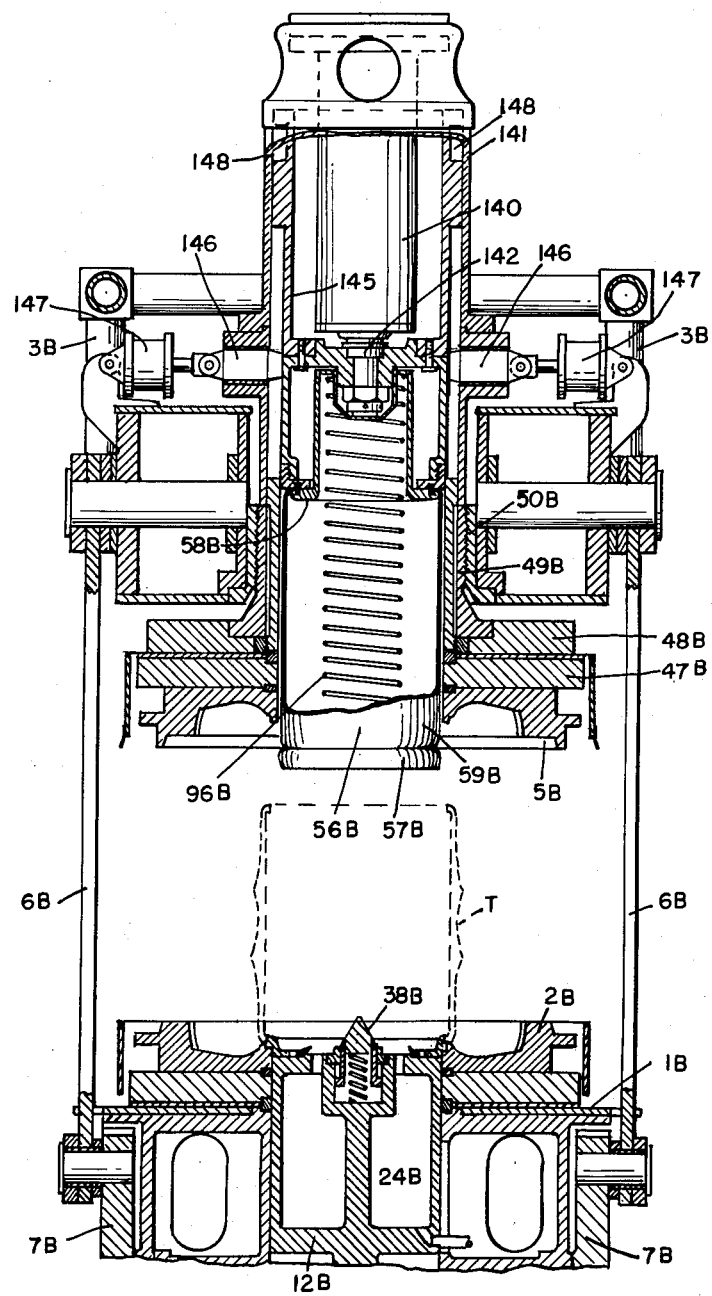
Figure 9:
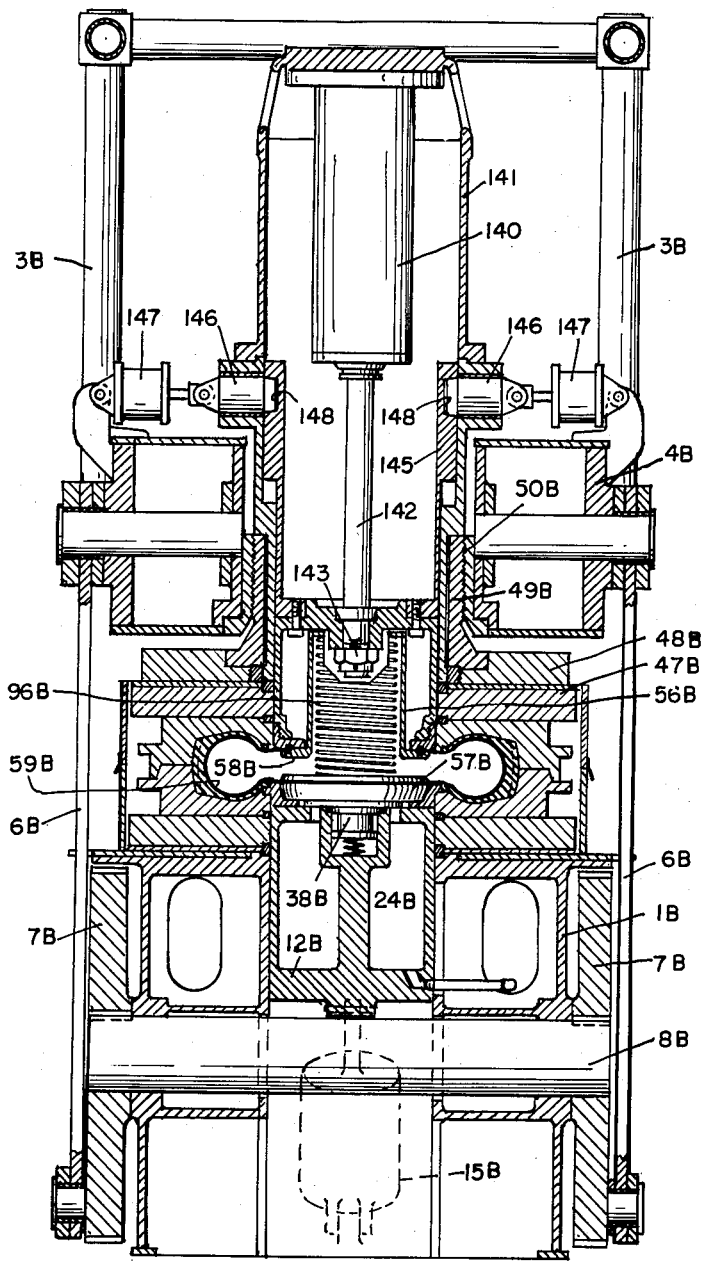
Figure 10:
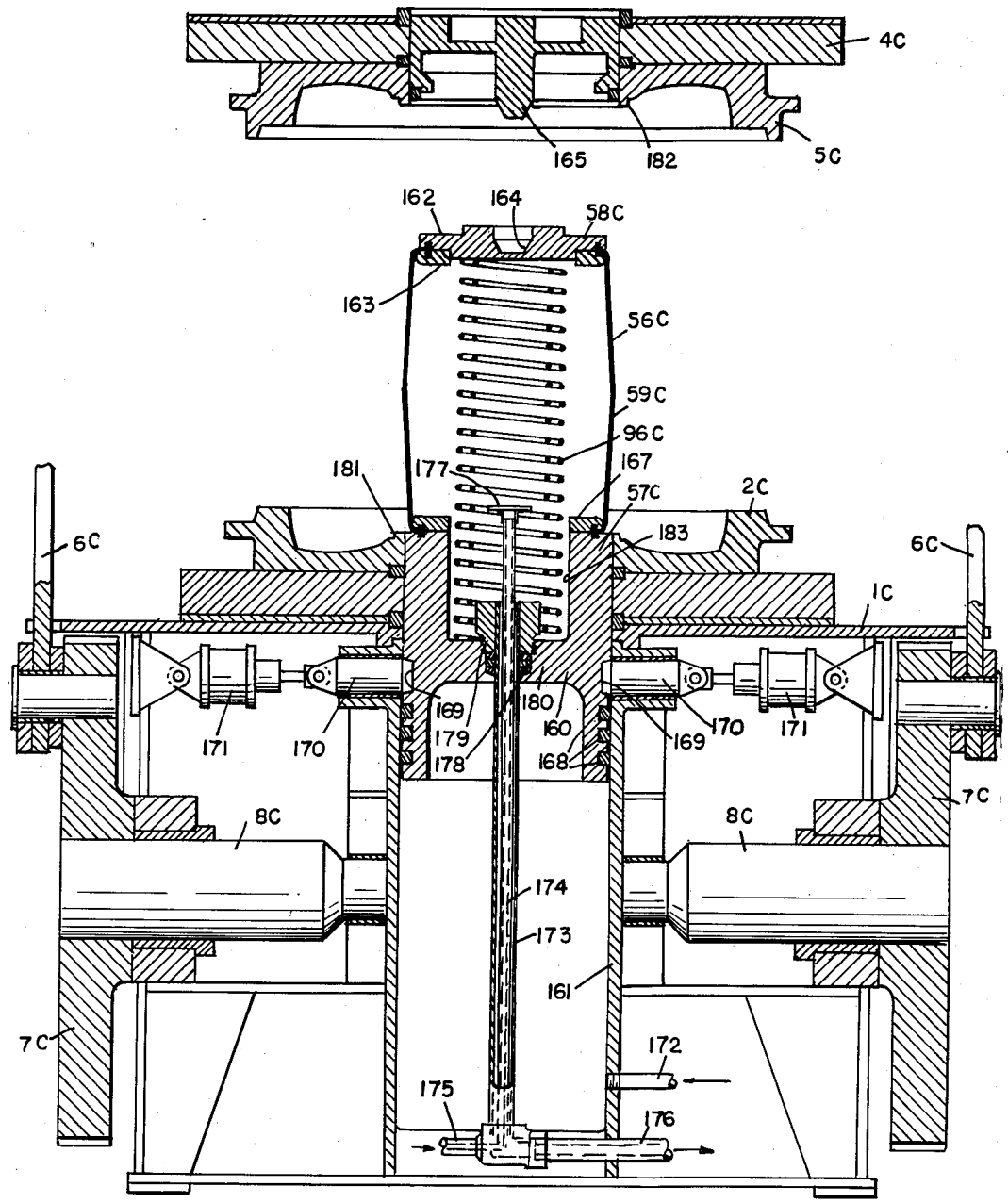
Figure 17:
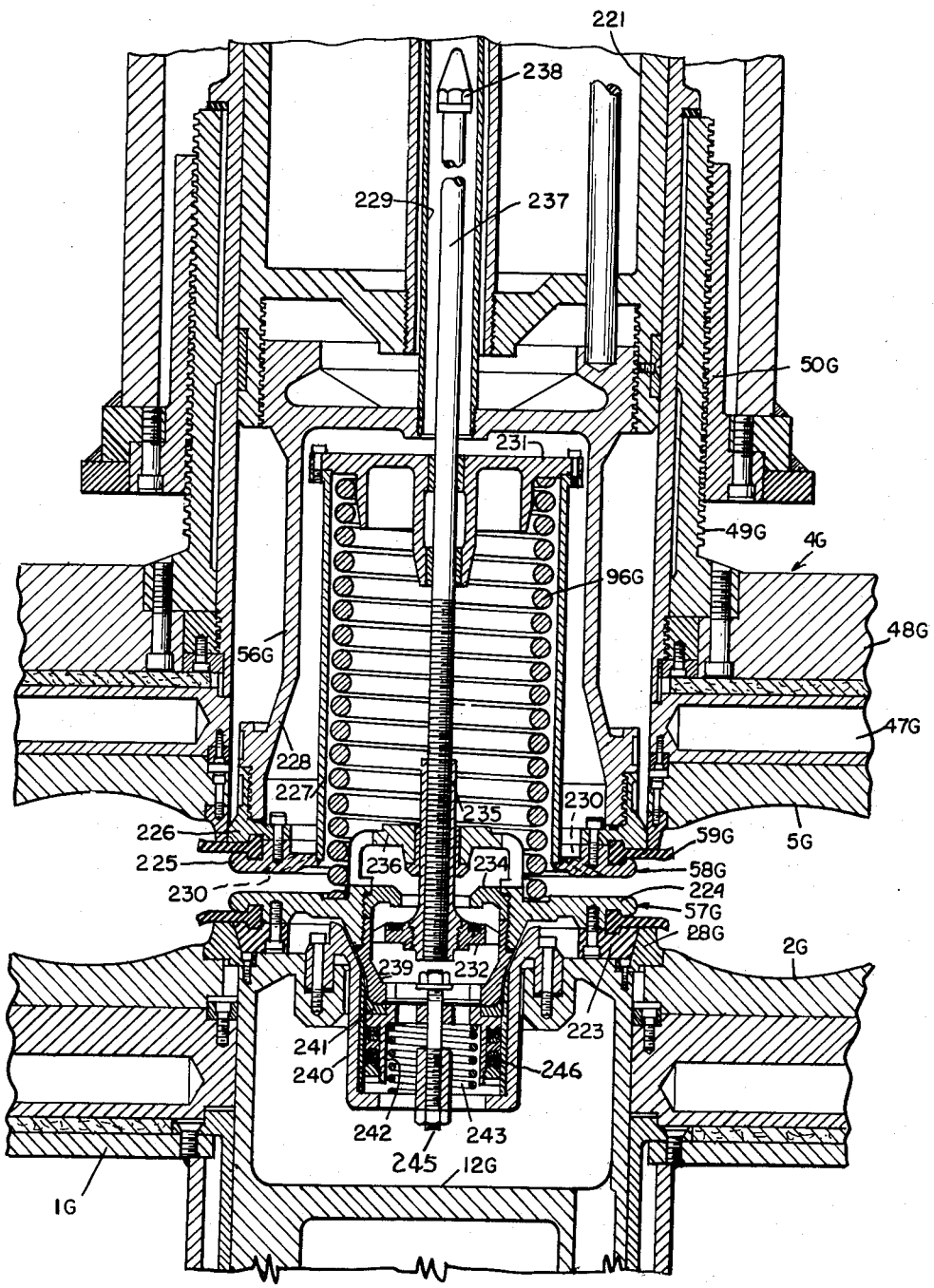

4 and 5 to show the drive mechanism for actuating the diaphragm assembly;

Fig. 7 is a fragmentary vertical cross section view of a bead stripper unit which is associated with the bottom mold section of the presses illustrated in Figs. 1 to 6;

Fig. 8 is a vertical cross section view of a modification in the actuator for the retractable diaphragm assembly, the press being in open position and said diaphragm assembly being in retracted position in the upper platen;

Fig. 9 is a cross section view of the press illustrated in Fig. 8 in a closed position, the diaphragm assembly having been previously protracted from the upper platen so as to depend downwardly from the top mold section;

Fig. 10 is a fragmentary vertical cross section view of a still further modification in which the diaphragm assembly is retractable into and protractable from a well formed in the lower portion of the base of the press, the bottom diaphragm head itself constituting a piston reciprocable in such well;

Figs. 11 and 12 are fragmentary vertical cross section views showing two different constructions for disposing of the curing medium from within the diaphragm assembly following the curing operation without requiring the separable valved drain connection shown in Fig. 3, for example;

Figs. 13 to 16 are schematic views of a still further modification illustrating the general sequence of operations of the press, which operations are for the most part applicable to the other forms of presses disclosed; and Fig. 17 is a cross section view similar to Fig. 3 except illustrating a modification.

Construction of press in Figs. 1, 2, 3 and 7

This press comprises a base 1 mounting an upwardly-facing bottom mold section 2 thereon and having a plurality of guide posts 3 extending upwardly therefrom, said posts vertically slidably supporting the upper press platen assembly 4 thereon. A downwardly-facing top mold section 5 is secured to the bottom of said platen assembly whereby, upon downward movement of said platen the mold sections 2 and 5 will engage one another to define a tire cavity therebetween. Vertical reciprocation of said platen assembly 4 is effected as for example through downwardly-extending links 6 pivotally connected at their ends to said assembly 4 and to bull gear cranks 7 which are carried on a shaft 8 journalled in said base 1, said gear cranks 7 being driven as by pinions 9 in mesh therewith and in mesh with gearing 10 on the output shaft of an electric motor drive unit 11.

The bottom mold section 2 is of ring-like form and has a piston-like bead stripping unit 12 therein constituting the bead portion of the mold cavity, said unit being adapted to be raised (when the press is open) with respect to said mold section 2 following the curing operation whereby to engage the bead of the cured tire and thus strip the tire from and lift the tire out of contact with said mold section 2. Said unit 12 extends downwardly through said mold section 2 and is vertically reciprocable in a guide bore 13 formed in base 1. The lower portion of said unit straddles the shaft 8 and is connected to a cross head 14 on a hydraulic actuator 15 as by means of studs 16 and 17 and jam nuts 18 and 19 as best shown in Fig. 7. Said actuator 15 comprises, for example, a piston and cylinder assemblage including a vertically disposed cylinder 20 fixed in said base and a piston 21 reciprocable in said cylinder and having its upper end secured to said cross head 14. Although a double-acting actuator or other actuating means including electrical or mechanical devices may be employed, the present construction is of the single-actuating type wherein the alternate admission of fluid under pressure into port 23 and venting of the fluid from said cylinder, the piston 21 may be raised to correspondingly raise the stripping unit 12 and permitted to descend by gravity to the position shown in Fig. 1, in which position the upper end of the stripping unit is seated in mold section 2.

The unit 12 is chambered as at 24 and again as best shown in Fig. 7, the lower portion of the unit which straddles the shaft 8 is provided with a drain passage 25 leading downwardly from the low point of such chamber. As shown, the stud 16 is in the form of a pipe nipple and has a pipe fitting 26 secured at its lower end and a flexible conduit, not shown, is adapted to be connected to said fitting to conduct the liquids in chamber 24 to a sewer or other suitable drain.

As best shown in Fig. 3, said bead stripper unit 12 has secured to its upper end as by means of bolts 27, a bead ring 28 adapted to be seated in a recess 29 around the inner edge of mold section 2. Said ring 28 has an outer surface 30 which, together with the surface 31 in mold section 2, constitutes the mold cavity in the mold section 2 conforming with one-half of the tire to be shaped and cured in the press. The surface 30 inclines and curves downwardly and outwardly whereby to form a shoulder adapted to engage the bead of the tire whereby the tire may be lifted from the mold section 2 upon raising of the unit 12 as aforesaid. Said ring 28 is also formed with an inner conical surface 32 which is adapted to receive a corresponding conical projection on the lower head of the diaphragm assembly to be presently described and in this way to center the diaphragm assembly with respect to said mold section.

Inward of said ring 28, the upper end of unit 12 is formed with an annular recess in which is secured a clamp ring 33 as by bolts 34, said ring 33 being formed to clamp a packing ring 35 in place in such recess. Said packing ring has a sealing lip 36 adapted to engage in sealed relation with the aforementioned lower diaphragm head.

Inward of said packing ring 35, the upper wall of unit 12 is formed with passages 37 therethrough leading into the chamber 24 and projecting upwardly from the center of such upper wall is a spring-loaded piloting plunger 38 having a conical tip 39 and a cylindrical skirt 40 which is slidably guided in a recess 41 formed in such upper wall. A spring 42 is compressed between said plunger 38 and the bottom wall of the recess 41 and yieldably urges the plunger upwardly, the upper limit of movement of the plunger being determined by the engagement of the flange 43 on said skirt 40 engaging a stop ring 45 which is secured around the open end of such recess as by means of screws 46.

The upper press platen 4 adjustably carries the top mold section 5 through the intermediary of plates 47 and 48 and an externally threaded cylinder 49 extending upwardly from said plates and having threaded engagement with a nut 50 in said platen. As apparent, relative rotation of said cylinder 49 and nut 50 will vertically adjust the mold section 5 so that in the closed position of the press the parting planes of the mold sections 2 and 5 will meet to define a closed tire cavity therebetween.

The top mold section 5 is generally the same as mold section 2 except that the bead ring 51, see Fig. 3, is fixed to the inner periphery by suitable bolts, not shown, and is adapted to engage within and on top of the top bead of the pulley band adapted to be positioned centrally between the mold sections 2 and 5. Said ring 51 has an outer surface 52 corresponding to the outer surface 30 of the previously-described bead ring 28 and with an inner surface 53 and ledge 54 constituting a seat for a portion of the upper head of the diaphragm assembly now to be described in detail.

The diaphragm assembly is indicated generally by the reference numeral 56 and comprises a lower head 57, an upper head 58 and a generally cylindrical diaphragm 59 of elastic material capable of being deformed from generally cylindrical form fitting within a pulley band to a radially expanded and axially contracted form engaging the entire inner surface of the shaped tire. Said diaphragm has its opposite ends secured to the respective heads 57 and 58.

Said lower head 57, as shown in Fig. 3, comprises inner and outer members 60 and 61 secured together as by circularly arranged screws 62 and formed with opposed annular recesses 63 and 64 in their juxtaposed faces between which the lower beaded end 65 of the diaphragm is securely clamped. Said outer member 61 has an outer conical surface 67 fitting within the bead ring 28 and matching the inner conical surface 32 of the latter whereby said lower head is co-axially positioned with respect to mold section 2 during the closing movement of the press and when the press is closed. Said member 61 has a top surface 68 which constitutes a support for the portion of the diaphragm 59 adjacent the beaded edge 65 and forms with the upper surface of the bead ring 28 a substantially continuous and uninterrupted surface to preclude the possibility of extrusion or pinching of the diaphragm when fluid under pressure is admitted thereinto.

Said inner member 60 has a bottom annular surface 69 which is adapted to make sealed engagement with the lip 36 of the packing ring 35 when the press is closed. Inward of the surface 69, said inner member 60 is formed with a downwardly opening recess 70 in which a valve member 71 is vertically slidable, said valve member having a seat washer 72 of resilient material fixed on its lower surface engageable and disengageable with an upwardly facing seat 73 formed on a seat ring 74 threadably secured in the lower end of such recess 70. Said valve member 71 has a conical recess to receive the conical tip 39 of the spring-loaded piloting plunger 38 and in this way preliminarily center the lower head 57 of the diaphragm assembly 56 during the closing movement of the press and prior to the interfitting of the conical surfaces 32 and 67 of bead ring 28 and outer member 61.

Valve member 71 is normally held in a seated position by a compression spring 75 acting thereon, said spring 75 being stronger than the spring 42 whereby said valve member will remain in a seated position until the lower end thereof strikes the stop ring 45 and when said valve member is thus unseated, fluid communication between the interior of the diaphragm assembly 56 and the chamber 24 in the stripper unit 12 is established through the passages 76 in the wall of the inner member 60, the passages 78 around the periphery of the valve member 71, the space between the seat washer 72 and the seat 73 and the passages 37 in the upper wall of unit 12.

The upper head 58 is generally similar to the lower head 57 and comprises inner and outer members 79 and 80 secured together as by screws 81 formed with opposed recesses 82 and 83 between which the beaded upper end 84 of the diaphragm 59 is firmly clamped. The bottom surfaces of the outer member 80 and the ring 51 are flush and define a substantially smooth uninterrupted supporting surface to preclude extrusion or pinching of the diaphragm 59 when fluid under pressure is admitted thereinto.

The inner member 79 has welded or otherwise secured thereto two coaxial sleeves 85 and 86 extending upwardly into the cylinder 49, said sleeves defining between them a relatively narrow annular space and the upper end walls 89 and 90 of said sleeves being spaced apart whereby curing medium may be introduced through the conduit 91 to flow downwardly through such annular space and thence into the diaphragm through the radiating passages 92 through inner member 79.

Secured centrally within the sleeves 85 and 86 and extending downwardly thereinto is a bushing member 93 providing an adjustable anchor means for a cable 94 and providing an anchor for a diaphragm assembly support rod 95. Said cable 94 limits separating movement of the upper and lower diaphragm heads 57 and 58 by spring 96 compressed therebetween, said cable passing through eye-bolts 97 threaded into inner member 60 and having its upper free ends clamped between wedge blocks 98 and 99, said wedge blocks being urged together by means of the screw 100 which is threaded into one of said blocks and bears on the other. Accurate adjustment of the length of the cable is effected by rotating the screw 101 which has threaded engagement with bushing member 93.

Figure 1:
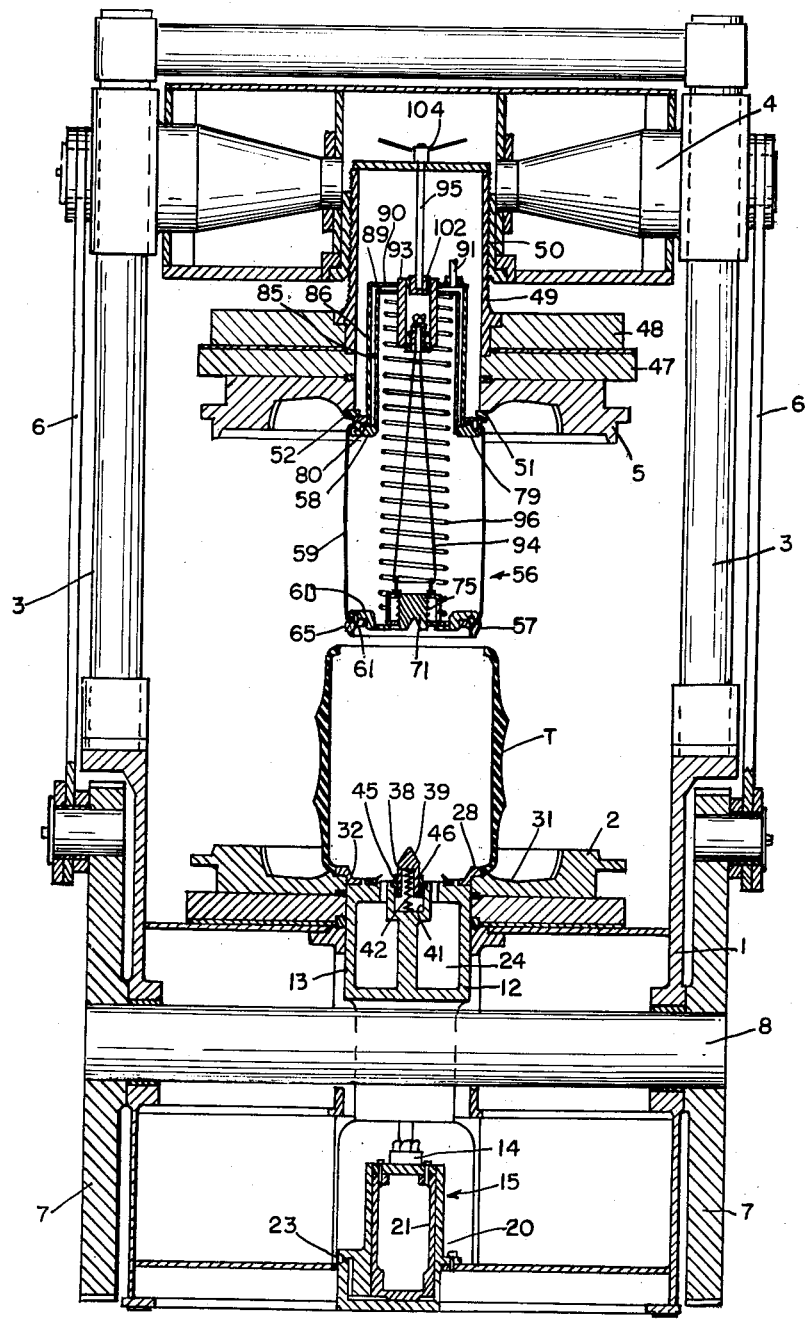
Fig. 1 is a central vertical cross section view of one embodiment of the invention.

The aforesaid support rod 95 has its lower end threaded into a socket member 102 which is removably secured to bushing member 93 by means of screws 103 and, as best illustrated in Fig. 1, the upper threaded end of said rod 95 extends through an aperture in the upper end wall of cylinder 49 and has threaded thereinto a handled nut 104 which, when tightened, draws the entire diaphragm assembly upwardly to firmly seat the upper head 58 in the upper bead ring 51, and of course when said nut 104 is unscrewed, the entire diaphragm assembly drops from the upper press platen 4 whereupon said assembly may be quickly replaced with a new or reconditioned diaphragm assembly to minimize the idle period of the press.

*Operation of press of Figs. 1, 2, 3 and 7*

Having thus described in detail the construction of one form of the press, reference will now be made to the general operation thereof, it being understood that where reference is made to operations which occur in predetermined sequence and in predetermined timed relation, the press may have associated therewith suitable automatic sequence and time control devices.

Figure 2:
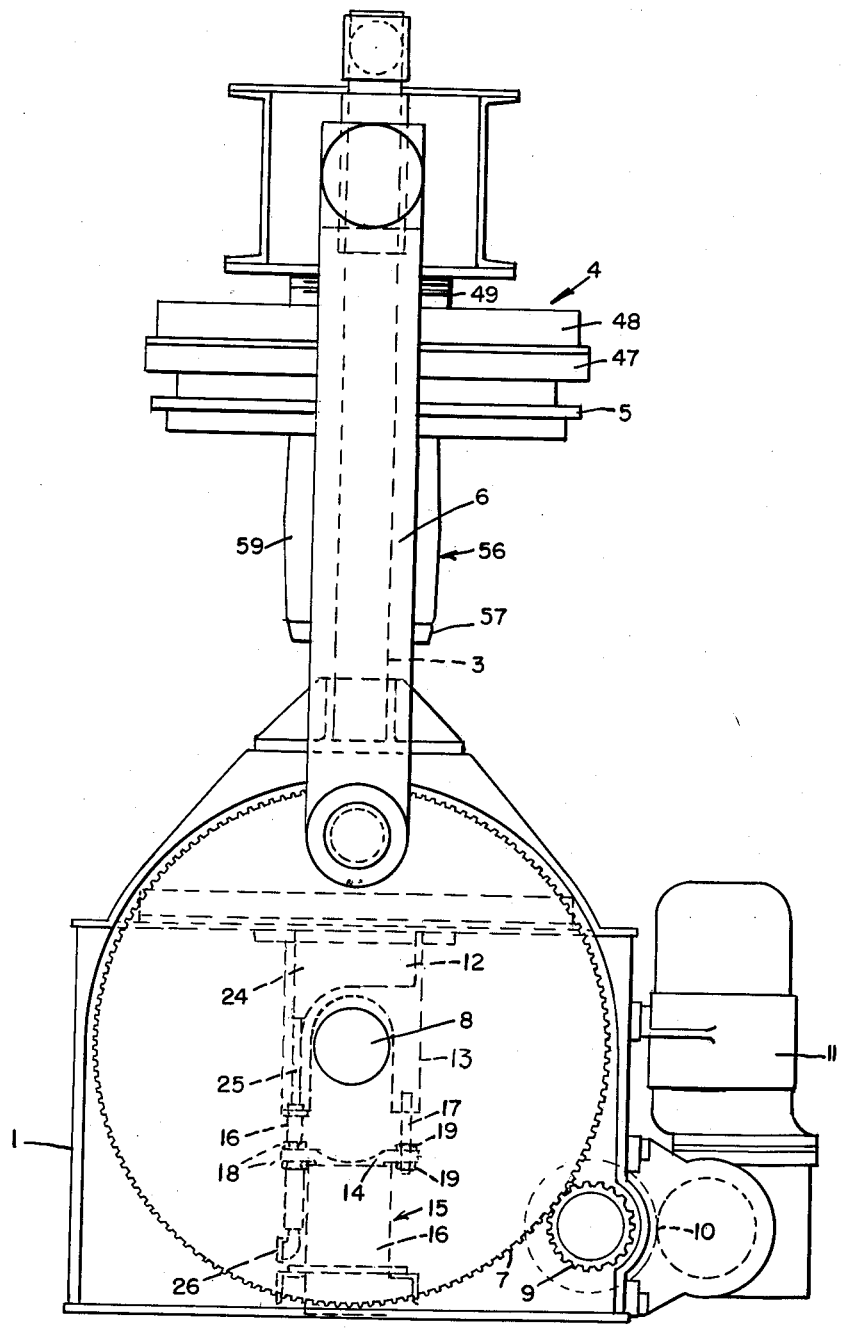
Fig. 2 is a right-hand side elevation view of the press illustrated in Fig. 1.

With the press in open position, as shown in Figs. 1 and 2, a green tire carcass T in pulley band form is laterally inserted without necessity of lifting or tilting between the mold sections 2 and 5 with its lower bead engaged around the bead stripper ring 28. The motor drive unit 11 is then energized to turn the bull gears 7 one-half revolution and thereby cause the upper press platen 4 and mold section 5 and diaphragm assembly 56 carried thereby to move downwardly until the mold sections 2 and 5 engage one another.

During the downward movement of the platen 4 as aforesaid, the diaphragm assembly 56 (held in an extended condition by the spring 96 therein and limited by the cable 94) telescopes within the carcass T and as said diaphragm assembly approaches the bead stripper unit 12, the piloting plunger 38 enters the conical recess in the lower diaphragm head 57 to thus steady and center the lower end of the diaphragm assembly. At about the same time, the upper bead ring 51 of mold section 5 engages the top bead of the carcass T. The downward movement of the lower diaphragm head 57 is finally arrested in an accurately seated position by means of the mating conical projection 67 and conical recess 32 in the stripper unit 12 and in this position valve member 71 is unseated whereby to establish fluid communication between the interior of the diaphragm assembly 56 and the chamber 24 in the stripper unit 12.

As the upper press platen 4 continues to move downwardly fluid under pressure may be admitted into the diaphragm assembly 56 through the conduit 91, the drain passage 25 in stripper unit 12 being at this time closed or partially closed by a suitable throttle valve or the like, not shown. The admission of fluid under pressure into the diaphragm assembly 56 causes the diaphragm 59 to belly outwardly and as the bead portions of the carcass T are forced closer by the continued downward movement of mold section 5, the carcass is progressively shaped into tire form until the mold sections 2 and 5 are engaged and at this stage of the operation, if not before, tire curing medium such as steam, for example, may be circulated through the diaphragm assembly 56 and at a pressure sufficient to cause the peripheral portion of the carcass T to be forced into the skid portions of the mold matrix defined between mold sections 2 and 5.

It is to be noted that in this closed position of the press, the lip 36 of the sealing ring 35 is engaged with the bottom surface of lower bead part 60 whereby to preclude possibility of leakage of curing medium into contact with the tire carcass T which would spoil the carcass.

The press is then held in a closed position for the requisite time period to effect the cure of the tire T and thereafter the electric motor drive unit 11 is again energized to raise the upper press platen 4 thereby stripping the mold section 5 upwardly away from the finished tire T and withdrawing the diaphragm assembly 56 from within the tire, the diaphragm assembly having theretofore been vented. During the initial stage of the withdrawing of the diaphragm from within the tire, the curing medium, which has condensed or collected in the lower portion of the cavity during the curing operation, is discharged into the chamber 24 of unit 12, and if desired, the diaphragm assembly 56 may be flooded with cold water. The rapid disposal of the hot curing medium or condensed curing medium from within the diaphragm assembly 56 and subsequent closure of the valve 71 to prevent inrush of air greatly enhances the life of the diaphragm 59.

In order to strip the finished tire T from the heated mold section 2 and thereby arrest the cure and prevent blemishing, fluid under pressure is admitted into actuating cylinder 15 to raise the bead stripper unit 12 and thus to lift the tire T out of the mold section 2. With the tire held in such elevated position, the same may be conveniently laterally removed from between the mold sections, the lower diaphragm head 57 now being well above the tire. As a final operation, the cylinder 15 is vented to allow the bead stripper unit 12 to descend by gravity to a seated position in mold section 2 ready to receive the next pulley band and repetition of the above-outlined steps of operation of the press.

The successive steps of operation of the press shown in Figs. 13–16 are generally the same as just described.

Figure 4:
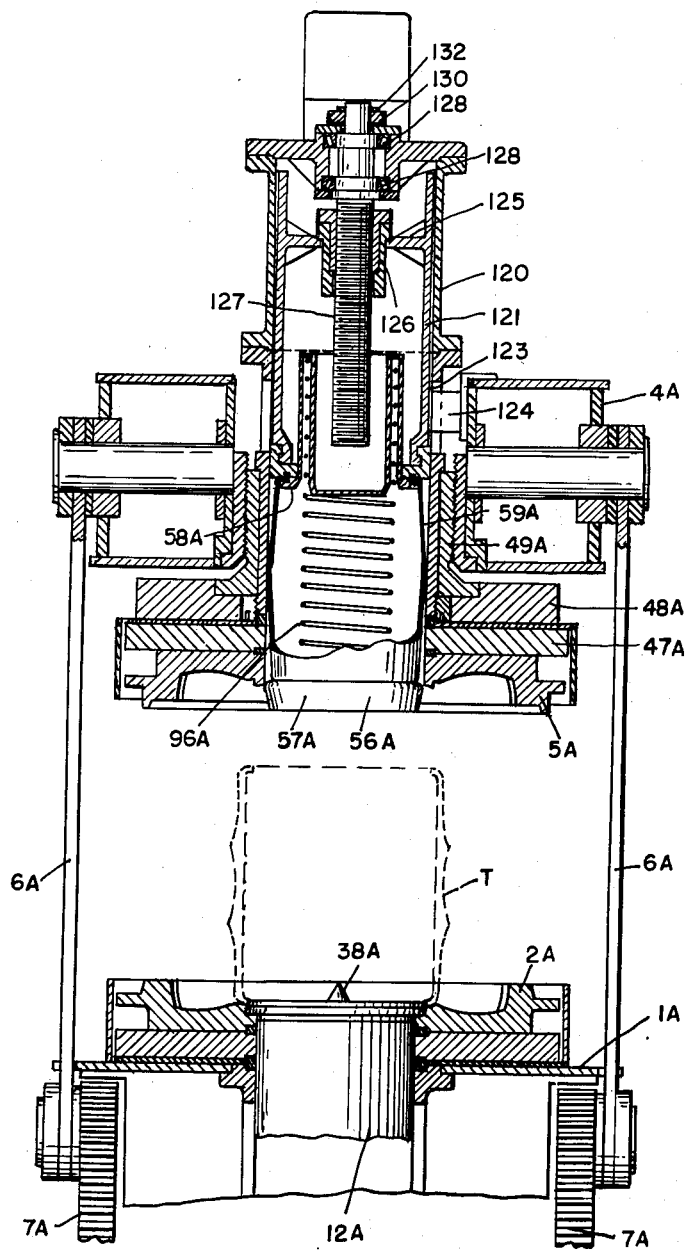
Fig. 4 is a vertical cross section view illustrating a modification in which the diaphragm assembly is retractable into a well formed in the upper movable platen of the press.

*Construction of press of Figs. 4, 5 and 6*

To the extent that the press illustrated in Figs. 4, 5 and 6 is generally the same as that illustrated in Figs. 1, 2, 3 and 7, like reference numerals with the suffix "A" have been used to denote similar parts. Thus, the base 1A rotatably supports bull gears 7A which, through the links 6A, effect vertical reciprocation of the upper press platen 4A. Mounted on said base 1A is the upwardly facing bottom mold section 2A and reciprocable within said mold section 2A is the bead stripper unit 12A, said stripper unit having a spring loaded piloting plunger 38A therein. Inasmuch as the actuating mechanism for the bull gears 7A and for the unit 12A can be the same as in Figs. 1, 2, 3 and 7, such mechanisms have not been illustrated in Figs. 4–6.

The upper press platen 4A again supports a top mold section 5A and through the intermediary of plates 47A and 48A and an upwardly-extending threaded cylinder 49A, there is afforded vertical adjustment of said mold section 5A so as to engage the mold section 2A when the platen 4A is actuated to its lowermost position.

One feature of distinction between the press of Figs. 4, 5 and 6 and that of Figs. 1, 2, 3 and 7 resides in the mounting of the diaphragm assembly 56A. Said diaphragm assembly 56A comprises lower and upper heads 57A and 58A clamping the beaded ends of the diaphragm 59A in the same general way as in Fig. 3, that is, between superimposed members having annular recesses in their juxtaposed faces and again a spring 96A is compressed between said heads 57A and 58A to normally hold said heads in spaced-apart relation with the diaphragm 59A held in a generally cylindrical form. The mounting of the diaphragm assembly 56A is such it may be vertically reciprocated independently of the upper press platen 4A in order to considerably reduce the stroke of the platen 4A as compared with the stroke of the platen 4 in the previously-described press. With such a construction, much smaller bull gears 7A may be employed whereby the mold section 2A will be at a convenient working height without lateral obstruction by said bull gears.

Such vertical reciprocation of the diaphragm assembly 56A is accomplished, for example, by forming the platen 4A with a tubular extension 120 in which an extension 121 of the upper diaphragm head 58A is slidably keyed, said extension 121 having one or more axial grooves 123 therein in which a corresponding number of keys 124 fit, said keys being mounted on platen 4A and extending radially through slots in platen 4A.

Said extension 121 is formed with a transverse web 125 having a nut 126 mounted at the center. Threadably engaged in said nut 126 is a threaded shaft 127 which is journalled as in bearings 128 in the upper end of said extension 120, said shaft 127 being driven in opposite directions as by means of a reversible electric motor 129 and belts 130 trained over pulleys 131 and 132 on the motor drive shaft and on the shaft 127 respectively. Said motor 129 is mounted on a suitable bracket 134 on said platen 4A.

The reciprocation of said diaphragm assembly 56A between the positions shown in Figs. 4 and 5 may be controlled by suitable limit switches or the like, not shown, in circuit with said motor 129, and of course, said motor will be controlled by a suitable switch which selectively causes rotation thereof in opposite directions.

*Operation of press of Figs. 4, 5 and 6*

With the press open and with the diaphragm assembly 56A retracted into the upper platen 4A a green tire carcass T may be readily laterally inserted between the mold sections 2A and 5A with the lower bead engaged around the upper end of the bead stripper unit 12A. Then, preferably before actuating the drive motor for the bull gears 7A, the motor 129 is energized to cause the diaphragm assembly 56A to descend with respect to the upper mold section 5A to the position shown in Fig. 5 whereupon the actuating mechanism for the upper platen 4A may be energized. The successive operations then correspond with those already outlined in connection with Figs. 1, 2, 3 and 7 except that, as a final operation, the motor 129 is again energized to rotate the shaft 127 in an opposite direction to retract the diaphragm assembly 56A into the upper press platen 4A to the position shown in Fig. 4. Reference may again be had to Figs. 13–16 for the general operation of the press.

*Press construction of Figs. 8 and 9*

This press is generally the same as that in Figs. 4 to 6 in that the diaphragm assembly is retractable into the upper press platen and in order to avoid the necessity of repeating the detail construction of the press, the reference numerals of parts similar to those in Figs. 1, 2, 3 and 7 have the suffix "B."

One distinguishing feature of the press illustrated in Figs. 8 and 9 is that the stripper unit 12B instead of straddling the bull gear shaft 8B has its lower end disposed above such shaft, and connected to said unit 12B are a pair of angularly disposed cylinders 15B which have their lower ends pivotally secured to the base 1B and the piston rods thereof pivotally secured at the lower end of said stripper unit 12B. As apparent, the raising and lowering of the stripper unit 12 is controlled by the admission of fluid under pressure into said cylinders 15.

Another difference in the press illustrated in Figs. 8 and 9 is that the diaphragm assembly 56B is actuated with respect to the mold section 5B by means of an actuating cylinder 140 which is carried in depending relation from the upper end wall of an extension 141 of the platen assembly 4B, said cylinder having its piston rod 142 secured as by means of the nut 143 to the upper end wall of the upper diaphragm head 58B. Extending upwardly from said upper diaphragm head 58B is a guide sleeve 145 which is slide guided in said extension 141. The stroke of said diaphragm assembly 56B is limited by the stroke of the piston in said cylinder 140, and in order to lock the diaphragm assembly in the protracted position, especially when a compressible fluid is employed for actuating said cylinder, latch members 146 radially slidably carried on the platen 4B are actuated as by cylinders 147 into engagement with notches or a peripheral groove 148 formed adjacent the upper end of said guide sleeve 145.

Operation of press of Figs. 8 and 9

The operation of this press is precisely the same as that illustrated in Figs. 4, 5 and 6 except that the control of the flow of fluid under pressure into the opposite ends of the actuating cylinder 140 and into the opposite ends of the latch actuating cylinders 147 replaces the electric switch control of the reversible motor 129 as in Figs. 4, 5 and 6, no latching being required in the latter because the threaded connection between the shaft 127 and the nut 126 is self-locking in an axial direction.

Construction of press of Fig. 10

This press again comprises a base 1C rotatably supporting the bull gear cranks 7C whereby, by reason of the connection of the links 6C between the gear cranks 7C and the upper press platen 4C, said platen may be raised and lowered to open and close the press. Again, as in the previously-described constructions, the base 1C carries a bottom mold section 2C thereon and the upper press platen carries the top mold section 5C. To this extent the construction of the press in Fig. 10 is similar to those illustrated in Figs. 1 through 9.

One difference in the press construction of Fig. 10 is that the lower head 57C of the diaphragm assembly 56C constituting the upper head 58C, the lower head 57C and the diaphragm 59C having its opposite beaded ends clamped in such heads, is in the form of a piston 160 reciprocable in a cylinder 161. The upper diaphragm head 58C comprises top and bottom sections 162 and 163 secured together as by screws (not shown) and formed with opposed annular recesses clamping the beaded upper end of the diaphragm 59C therebetween, said top section 162 being formed with a conical recess 164 adapted to be engaged by the correpondingly-shaped aligning pilot 165 carried by the upper press platen 4C.

The lower head 57C similarly comprises top and bottom sections 167 and 160 formed with opposed annular recesses between which the lower beaded end of the diaphragm 59C is clamped, said bottom section 160 being formed with peripheral grooves in which are disposed piston rings 168 adapted to make sliding, sealing engagement with the wall of the cylinder 161. Said bottom section 160 is also formed with notches or a peripheral groove 169 in which latch members 170 are adapted to be engaged when the diaphragm assembly 56C is elevated to the position illustrated in Fig. 10, said latch members 170 being radially reciprocably carried in base 1C and being projected into such notches or peripheral groove 169 by means of actuating cylinders 171 operatively positioned between said base and said latch members.

In the position of the diaphragm assembly, shown in Fig. 10, the lower head 57C is locked against vertical movement whereby the upper press platen 4C may be caused to descend to engage the upper diaphragm head 58C and to cause the bead portion of the mold section 5C to engage the upper bead of a pulley band which is adapted to be seated on the mold section 2 prior to the raising of the diaphragm assembly 56C to the position shown.

Vertical reciprocation of said diaphragm assembly is controlled by alternately admitting fluid under pressure through the pipe 172 into said cylinder 161 and venting the cylinder, or if necessary, withdrawing the fluid from within the cylinder at sub-atmospheric pressure.

Extending upwardly from the lower end of said cylinder 161 is a tubular stem 173 having a tube 174 of smaller diameter telescoped therewithin. In the present case, curing medium or other fluid under pressure is adapted to flow from pipe 175 into the diaphragm assembly 56C through the tube 174 against a deflecting plate 177 and thence radially between the diaphragm head parts 163 and 167 into the bellied-out diaphragm 59C and to be drained from the diaphragm assembly through the annular space between tube 174 and surrounding stem 173 and out through the pipe 176. Surrounding the tubular stem 173 and making sealed engagement therewith is a packing ring 178 held in place by a gland nut 179 threaded into a transverse partition wall 180 in said lower diaphragm head 57C.

Again, as in the previously-described presses, one or more springs 96C are compressed between the lower and upper diaphragm heads 57C and 58C whereby to normally tend to extend the diaphragm 59C to its generally cylindrical form, in which form the diaphragm assembly 56C, as a whole may be retracted into the well defined by cylinder 161.

Operation of press of Fig. 10

With the press open and the diaphragm assembly 56C in its lower-most position retracted into cylinder 161, a green tire carcass in pulley-band form may be laterally inserted between the mold sections 2C and 5C with the lower bead portion thereof resting on the bead ring portion 181 of the lower mold section 2C. With the pulley band thus centered on the lower mold section 2C, fluid under pressure is admitted into the cylinder 161 through the pipe 172, whereby the diaphragm assembly 56C as a whole is forced upwardly, and when said assembly reaches the position shown in Fig. 10, the latch-actuating cylinders 171 are actuated to cause the latch members 170 to move inwardly into engagement with the notches or peripheral groove 169 formed in the lower diaphragm head 57C. When the parts are in this position, the bull gear cranks 7C may be rotated one-half revolution to cause the upper press platen 4C to descend, whereupon the conical pilot 165 carried by the upper press platen 4C engages within the conical recess 164 formed in the upper diaphragm head 58C and at about the same time, the bead portion 182 of the upper mold section 5C engages the upper head of the pulley band whereby the continued downward movement of the upper press platen effects forcing together of the beads of the pulley band and a radial expansion and axial contraction of the diaphragm 59C in the manner previously indicated.

The press then finally reaches the closed position with the mold sections 2C and 5C in engagement with one another and with the tire carcass in a shaped form having the diaphragm 59C in engagement with the entire inner surface of the tire. As previously indicated, curing medium may be flowed under pressure through the expanded diaphragm assembly 56C whereby to expand the tire into the anti-skid portions of the mold matrix and to effect curing of the tire. At the completion of the curing operation, the bull gear cranks 7C are again caused to rotate the remaining half revolution to raise the upper press platen 4C and thus strip the upper mold section 5C from the finished tire. At the same time, the springs 96C within the diaphragm assembly 56C cause the upper diaphragm head 58C to move upwardly with respect to the lower diaphragm head 57C to thereby withdraw the diaphragm from within the cured tire. Following or during the stripping of the diaphragm 59C from within the tire the latch members 170 are moved outwardly by actuation of the latch actuating cylinders 171 whereupon the diaphragm assembly 56C descends into the cylinder 161 to an out-ofthe-way position from between the mold sections 2C and 5C. To assist in the descent of the diaphragm assembly suction may be employed to reduce the pressure in cylinder 161 to subatmospheric.

It is to be noted that, when the diaphragm assembly 56C is in the position shown in Fig. 10, the curing medium which is condensed or collected therein during the curing operation will be discharged into the well 183 formed in the lower diaphragm head and any fluid above the upper open end of the tubular stem 173 will flow through the annular space between said stem and the tube 174 and will be discharged through the pipe 176 into a suitable drain or sewer.

With the diaphragm assembly in its lowered position the completed tire may be stripped from the lower mold section 2C. If desired, the bead portion 181 of said mold section 2C may be vertically reciprocable independently of the diaphragm assembly 56C so as to permit prompt lifting of the time free from the heated mold section 2C whereby to preclude the possibility of overcuring or blemishing by reason of the contact between the side wall and skid portions of the tire with the heated mold section 2C.

*Construction of press of Fig. 11*

In view of the fact that this press construction as a whole may be similar to those illustrated in Figs. 1 through 9, only the portions of the press which are different have been illustrated in Fig. 11. Thus, the lower portion of the base 1D, the heater plate only being shown, carries the lower mold section 2D and vertically reciprocable within said lower mold section is the stripper unit 12D which, in this case, need not be provided with the spring-loaded piloting plunger 38 and the passages 37 leading into a chamber formed in said unit.

The upper mold section 5D is again carried by the upper press platen 4D and is adjustable therein by means of the threaded cylinder 49D having threaded engagement with a nut 50D in said platen.

The diaphragm assembly 56D comprises a lower head 57D, an upper head 58D and a generally cylindrical diaphragm 59D having its opposite beaded ends clamped in the respective heads. The lower head 57D comprises a two-piece disc-like member 190 having an outer conical surface 191 adapted to enter a conical recess 192 formed in the upper end of the stripper unit 12D. Secured on top of said disc-like member 190 is a clamping ring 193, the securing means being the screws 194. The juxtaposed faces of the outer ring-like piece of said disc-like member 190 and said ring 193 are formed with opposed annular recesses for clamping therein the beaded end of the diaphragm 59D.

The upper diaphragm head 58D comprises top and bottom rings 195 and 196 held together by screws 197 and formed with opposed annular recesses clamping the upper beaded end of the diaphragm 59D therebetween, said top ring 195 being seated in the bead ring 198 of the top mold section 5D. Extending upwardly from the bottom ring 196 into the upper press platen 4C are a pair of sleeve-like members 200 and 201 forming an annular space therebetween and having their upper ends spaced apart whereby fluid under pressure may be introduced into the diaphragm assembly 56C through the conduit 202 and caused to flow downwardly through such annular space and thence be directed radially through the passages 203 formed in the bottom ring 196.

Again, as in the previously-described presses, a spring 96D is compressed between the upper and lower diaphragm heads 57D and 58D and a cable 94D having its opposite ends connected to the respective heads limits the separating movement and thus precludes the possibility of overstressing the diaphragm 59D.

The diaphragm assembly 56D as a whole is detachably connected to the upper press platen 4D as by means of a pair of rods 95D threaded into the upper diaphragm head 58C and having upper threaded ends extending through the upper end wall of cylinder 49D and nuts 104D threaded onto such upper ends of said rods.

In order to steady and guide the lower head 57D of the diaphragm assembly 56D and also to provide a passage for disposing of the curing medium from within the diaphragm assembly, said lower head has fixed thereto a tubular member 204 which extends upwardly through the upper diaphragm head 58D and through the top wall of the cylindrical member 49D and has a fitting 205 at its upper end to which a flexible conduit or the like may be connected. The intermediate portion of said tube is slidable in a packing assembly 206 in the upper diaphragm head. The lower end of said tube is provided with one or more transverse openings 207 whereby, when the press begins to open and the diaphragm assembly 56D starts to withdraw from within the cured tire, the curing medium will run into the well 208 formed within the ring 193 whereupon the tube 204 may be communicated with a vacuum source to draw up such curing medium.

*Operation of press of Fig. 11*

The operation of this press is substantially the same as that illustrated in Figs. 1, 2, 3, and 7 except the above-described expedient of disposing of the condensed or collected curing medium from within the diaphragm assembly 56D, and therefore, the repetition of the successive steps in the operation of the Fig. 11 press is not deemed necessary.

*Construction of press of Fig. 12*

The press illustrated in Fig. 12 is substantially the same as that illustrated in Fig. 11 with the exception that the tube 210 which extends downwardly through the upper diaphragm head 58E does not extend all the way down to the lower diaphragm head 57E except in the closed position of the press. It is noted that the lower end of said tube bears a fixed relation with respect to the upper diaphragm head 58E and that such lower end is notched or otherwise provided with passages 212 whereby, when the press is just opening, the curing medium which runs down into the well 213 formed by the top ring section 214 and the disc-like member 215 can be withdrawn from within the diaphragm assembly by means of a vacuum pump or the like. In the closed position of the press the tube 210 is disposed with respect to the lower diaphragm head 57E as shown in dotted lines in Fig. 12. The tube 210 constitutes a support for the diaphragm assembly 56E and has threaded thereonto a nut 216 to hold the diaphragm assembly in place.

*Operation of press of Fig. 12*

Here again, inasmuch as the operation of the Fig. 12 press is the same as the Fig. 11 and Figs. 1 to 3 and 7 presses, repetition is not deemed necessary. Although the construction in Fig. 12 is not capable of completely withdrawing the curing medium from within the diaphragm assembly, the negligible volume of such medium which may remain in the aforesaid well 213 is not harmful to the parts of the lower diaphragm head 57E and of course, the important thing is that such curing medium is out of contact with the diaphragm 59E, and inrush of air is prevented.

*Construction of press of Figs. 13 to 16*

This press is essentially the same as illustrated in Figs. 1, 2, 3 and 7 and differs essentially only in the mounting of the bull gear cranks 7F on the beam of the upper movable press platen 4F while the links 6F connected thereto extend downwardly and are pivotally connected to fixed trunnions on the base 1F of the press. Obviously, the diaphragm assembly 56F may be mounted in any of the different ways previously described, and for convenience, the diaphragm assembly is mounted in a depending relation from the upper movable platen 4F of the press as in Figs. 1, 2, 3 and 7.

Operation of press of Figs. 13 to 16

In Figs. 13 to 16 are shown the successive steps in the operation of this press, it being noted that the successive steps are generally the same as previously described in connection with the other forms of presses.

After the green tire carcass T in pulley-band form has been positioned on the lower mold section 2F as shown in Fig. 13, the bull gears 7F may be rotated one-half revolution to insert the diaphragm assembly 56F within said carcass and to cause the upper mold section 5F to engage the upper bead portion of the carcass.

As in the other forms of the invention, the conical piloting plunger 38F engages within a conical recess in the lower diaphragm head 57F to position the diaphragm assembly 56F and particularly the lower head concentrically within the carcass. As the press closes, the diaphragm 59F bellies out as shown in Fig. 14 and the concurrent movement of the bead portions of the carcass toward each other causes the carcass to be progressively radially expanded. When the press finally closes and curing medium is circulated through the diaphragm assembly, the tire will be in its final form as shown in Fig. 15 and will be cured.

After the cure, the bull gears 7F may again be rotated the remaining one-half revolution to open the press, and at about the same time the stripper unit 12F may be elevated to strip the tire from the hot lower mold section 2F, the continued upward movement of the upper mold section 5F together with the diaphragm assembly 56F effecting a withdrawal of the diaphragm assembly from within the tire until finally the diaphragm assembly assumes its normally cylindrical form and is completely extracted from within the tire T. With diaphragm assembly 56F raised as in Fig. 13 and the tire T lifted as in Fig. 16, the tire T may be readily laterally removed from in between the mold sections 2F and 5F and the operation repeated by the lateral insertion of a new uncured carcass.

Construction of press of Fig. 17

This press comprises a base 1G carrying an upwardly facing bottom mold section 2G thereon and vertically movably supporting an upper movable press platen assembly 4G, the latter again as in Fig. 3 for example comprising plates 47G and 48G and threadedly engaged members 49G and 50G. Carried on the under side of said plate 47G is the downwardly facing top mold section 5G.

The means for relatively reciprocating the mold sections 2G and 5G may be of any of the previously illustrated forms and therefore said means have been omitted in Fig. 17.

Vertically reciprocable in said base 1G is a bead stripper unit 12G having mounted thereon a bead ring 28G adapted to be seated in a recess formed the mold section 2G to form the bead portion of the mold and adapted to be raised upon raising of said unit 12G to strip the cured tire carcass from the mold section 2G. Said unit 12G may be actuated as by means of the piston and cylinder assemblage 15 shown in Fig. 1.

Said platen assembly 4G vertically reciprocably carries a diaphragm assembly 56G comprising a lower head assembly 57G, an upper head assembly 58G, and a flexible diaphragm 59G which has its opposite beaded edges clamped in said bead assemblies. Here again, any desired means such as the screw means illustrated in Fig. 4 or the fluid pressure operated means illustrated in Fig. 8 will be employed to effect desired protraction and partial or entire retraction of the diaphragm assembly into a well formed in the upper press platen, said reciprocating means being operatively connected to the sleeve-like extension assembly 221 of the upper diaphragm bead assembly 58G which is vertically slide-guided in said platen assembly.

Said diaphragm assembly 56G is, for the most part, generally similar to that illustrated in Fig. 3, the lower diaphragm bead being clamped in the opposed recesses of rings 223 and 224 and the upper diaphragm bead being clamped in opposed recesses of rings 225 and 226, said last-named rings having sleeve-like extensions 227 and 228 secured thereto between which curing medium is adapted to flow downwardly as from the conduit 229 and thence radially through the passages 230 in ring 225 into the space within the bellied-out diaphragm 59G.

Compressed between said diaphragm beads 57G and 58G or more specifically between ring 224 and a closure member 231 secured across the upper end of extension 227 is a spring 96G, said spring in addition to having the function of separating the diaphragm beads upon opening of the press having the function of seating the valve member 232 against a seat ring 234 which is secured centrally within the ring 224. Said valve member 232 has an internally threaded stem 235 which is vertically slide-guided in a spider 236 and which stem has threaded engagement with the lower end portion of a rod 237, said rod extending through a bushed passage in the closure member 231 and having a headed upper end portion 238 adapted to abut said closure member upon opening of the press and consequent separation of the diaphragm beads 57G and 58G through the influence of spring 96G.

With the press in open condition and with the headed portion 238 of said rod 237 engaged with a part of the upper diaphragm head 58G, here the closure member 231, the valve member 232 will be yieldably seated against the seat ring 234 to close the opening through the latter and thus close the space within the diaphragm assembly 56G. Said rod 237 serves to steady the lower diaphragm head assembly 57G as does the conduit 204 in the Fig. 11 press, and serves further to limit the separation of the diaphragm heads whereby the diaphragm will not be overstretched, the latter function of said rod 237 being the same as that of the cables 94 in the previously described presses. It is to be noted that the distance between the diaphragm heads may be adjusted as desired simply by turning said rod 237 in either direction as by means of a suitable wrench inserted into conduit 229 and engaged with the headed end portion 238 of said rod, the valve member 232 being held against rotation by reason of its engagement with seat ring 234.

It will be apparent that when the press is in closed position as shown in Fig. 17 with the diaphragm heads moved toward each other, said rod 237 and valve member 232 will drop by gravity and by the pressure of the curing medium circulated through the diaphragm assembly whereby during the initial stages of the opening of the press the curing medium which collects in the lower well portion of the expanded diaphragm 59G will be drained into the reservoir formed by the bead stripper unit 12G.

In order to assure fluid-tight sealing between the lower diaphragm head assembly 57G and the portion of the bead stripper unit 12G engaged thereby and to assure concentric positioning of said head assembly with respect to the mold section 2G, the part 224 of said head assembly carries a frusto-conical member 239 which fits within the flared opening of a cup-like member 240 secured to said bead stripper unit 12 and which member 239 has its lower end face yieldably engaged with a rubber or rubber-like sealing gasket 241 on the upper end of a spring biased tubular plunger 242. Said plunger 242 is vertically reciprocable in said cup member 240 and is constantly urged upwardly by the spring 243 which is compressed between said member and plunger. Upward movement of said plunger 242 is arrested by engagement thereof with the headed upper end of a stud 245 secured to said cup member 240. Said plunger 242 and member 239 are provided with passages therethrough to permit flow of fluid from within the diaphragm assembly 56G into the stripper unit reservoir when the valve member 232 is unseated.

Said plunger 242 has suitable packing rings 246 therearound to preclude leakage of fluid upwardly therepast.

*Operation of press of Fig. 17*

The operation of this press is substantially the same as that of Figs. 1, 2, 3 and 7 for example. With the press in open condition, a tire carcass in pulley-band form may be laterally inserted between the mold sections 2G and 5G to a position resting on the mold section 2G and telescoped over the bead ring 28G of the bead stripper unit 12G. The diaphragm assembly 56G may now be lowered into telescoped relation within such tire carcass and then the diaphragm assembly and the mold section 5G can be lowered in unison whereupon the mold section 5G engages the upper edge of the carcass and the lower diaphragm head 57G engages the bead stripper unit 12G, that is, the member 239 engages the plunger 242 to effect a fluid-tight seal between said lower bead and stripper unit, and the lower diaphragm ring 223 seats in the ring 28G to accurately position the lower diaphragm head with respect to the mold section 2G.

Downward movement of said lower diaphragm head 57G is thus arrested whereupon continued downward movement of the upper press platen 4G causes compression of spring 96G, bellying out of the diaphragm 59G by fluid under pressure within said diaphragm assembly, and unseating of the valve member 232. With the press in fully closed position, curing medium entering the diaphragm assembly 56G through conduit 229 flows downwardly through the annular space between sleeve extensions 227 and 228 and radially outward through passages 230 and sweeps around the inner wall of the diaphragm 59G and finally flows radially inward and out of the diaphragm assembly through the unseated valve member 232.

After the cure, the upper press platen 4G is raised to drain the curing medium from within the diaphragm assembly 56G, to withdraw the diaphragm from the cured tire, and to strip the mold section 5G from the top half of the cured tire; the diaphragm assembly 56G is raised with respect to the mold sections 5G and 2G to withdraw said assembly from a telescoped relation with the tire; and the bead stripper unit 12G is raised with respect to mold section 2G whereby the cured tire is supported on the ring 28G out of contact with the mold section 2G ready for withdrawal from between the mold sections 2G and 5G.

It is to be noted that during the opening of the press and upward movement of the upper diaphragm head assembly 58G, the spring 96G will hold the lower diaphragm head assembly 57G in seated position and as the diaphragm 59G is extended thereby to a generally cylindrical form the valve member 232 will be actuated to seated position through rod 237 to prevent inrush of air into the diaphragm assembly 56G, this, together with the prompt draining of the curing medium, greatly enhancing the life of the flexible diaphragm 59G.

Other modes of applying the principle of the invention may be employed, change being made as regards the details described, provided the features stated in any of the following claims, or the equivalent of such, be employed.

I therefore particularly point out and distinctly claim as my invention:

1. In a press for shaping and curing pneumatic tires, the combination of a bottom mold section adapted to support an uncured pulley-band tire carcass on edge thereon, a top mold section movable coaxially toward said bottom mold section into engagement with the upper edge of such carcass, a radially expansible forming unit having upper and lower ends and an elastic side wall therebetween, said unit being carried by said top mold section for movement into telescoped relation within such carcass, means supporting said unit in downwardly depending relation from said top mold section with the lower end of said unit disposed for engagement with said bottom mold section during downward movement of said top mold section for causing the ends of said unit to be moved toward each other thereby making possible radial expansion of the side wall of said unit by application of internal fluid pressure therein, means for moving said top mold section downwardly to progressively deform the carcass to tire shape between said mold sections and around said unit, a valve mechanism in the lower end of said unit for disposing when opened of fluids which may collect in the lower end portion of said unit incidental of circulation of heated curing medium therethrough, and means for opening said valve mechanism upon movement of said unit to a position with its lower end engaged with said bottom mold section.

2. A press according to claim 1 characterized further in that said valve mechanism comprises a valve member carried in the lower end of said unit, and a valve seat in said unit toward and away from which said valve member is adapted to be moved.

3. A press according to claim 2 characterized further in that a rod extends through the upper end of said unit and is secured to said valve member, and that a spring is compressed between the ends of said unit, said rod being adapted to be engaged by the upper end of said unit and through said spring to yieldably hold said valve member in engagement with said valve seat.

4. A press according to claim 2 characterized further in that there is a spring-loaded plunger adapted to sealingly engage the lower end of said unit.

5. In a press for shaping and curing pneumatic tires, the combination of a bottom mold section adapted to support an uncured pulley-band tire carcass on edge thereon, a top mold section movable coaxially toward said bottom mold section into engagement with the upper edge of such carcass, a radially expansible forming unit carried by one of said mold sections for movement from a retracted position therewithin to a position projecting centrally therefrom in telescoped relation with such carcass with the end of said unit remote from said one mold section in the aforesaid projected position disposed for engagement by the other mold section during downward movement of said top mold section whereby to progressively radially expand said unit and thus to deform the carcass therearound, means for so moving said unit, a normally closed valve mechanism in one end of said unit, valve opening means operated by engagement between said other mold section and the end of said unit engaged thereby for allowing circulation of heated curing medium through said unit.

References Cited in the file of this patent

UNITED STATES PATENTS

| | | |
|---|---|---|
| 1,925,995 | De Mattia | Sept. 5, 1933 |
| 1,977,119 | De Mattia | Oct. 16, 1934 |
| 2,243,532 | Maynard | May 27, 1941 |
| 2,255,646 | Brewer et al. | Sept. 9, 1941 |
| 2,296,800 | Soderquist | Sept. 22, 1942 |
| 2,337,857 | Soderquist | Dec. 28, 1943 |
| 2,495,663 | Soderquist | Jan. 24, 1950 |
| 2,495,664 | Soderquist | Jan. 24, 1950 |
| 2,559,119 | Frank | July 3, 1951 |